(12) United States Patent
Pino, Jr.

(10) Patent No.: US 11,815,728 B2
(45) Date of Patent: Nov. 14, 2023

(54) ROADWAY ACCESS HOLE CUTTER AND METHOD OF CUTTING A SQUARE OR RECTANGULAR ROADWAY ACCESS HOLE

(71) Applicant: CCIIP LLC, New York, NY (US)

(72) Inventor: Angelo J. Pino, Jr., New York, NY (US)

(73) Assignee: CCIIP LLC, New York, NY (US)

( * ) Notice: Subject to any disclaimer, the term of this patent is extended or adjusted under 35 U.S.C. 154(b) by 37 days.

(21) Appl. No.: 17/713,361

(22) Filed: Apr. 5, 2022

(65) Prior Publication Data
US 2022/0229259 A1    Jul. 21, 2022

Related U.S. Application Data

(63) Continuation-in-part of application No. 17/542,596, filed on Dec. 6, 2021, which is a continuation of application No. 17/197,356, filed on Mar. 10, 2021, now Pat. No. 11,215,781.

(60) Provisional application No. 63/170,972, filed on Apr. 5, 2021, provisional application No. 63/118,993, filed on Nov. 30, 2020.

(51) Int. Cl.
*E02F 5/12* (2006.01)
*G02B 6/50* (2006.01)

(52) U.S. Cl.
CPC ............ *G02B 6/504* (2013.01); *E02F 5/12* (2013.01)

(58) Field of Classification Search
CPC ..... E01C 23/0933; B28D 1/048; B23D 45/10; G02B 6/504; G01V 3/08; E21B 7/046; E02F 5/12; E02F 5/145; E02F 3/26; E02F 9/245
See application file for complete search history.

(56) References Cited

U.S. PATENT DOCUMENTS

| | | | |
|---|---|---|---|
| 4,434,861 A | 3/1984 | Howeth |
| 4,668,548 A | 5/1987 | Lankard |
| 4,744,693 A | 5/1988 | Smith |
| 4,812,078 A | 3/1989 | Rivard |
| 5,244,304 A | 9/1993 | Weill |
| 5,913,638 A | 6/1999 | Lansdale |

(Continued)

FOREIGN PATENT DOCUMENTS

| | | |
|---|---|---|
| CA | 2348062 | 11/2001 |
| WO | 2016/088083 | 9/2016 |

OTHER PUBLICATIONS

Camplex Fiber Optic Extender, http://www.camplex.com/product.aspx?item=CMX-TACNGO-SDI, Oct. 17, 2017 pp. 1-2.

(Continued)

*Primary Examiner* — Benjamin F Fiorello
(74) *Attorney, Agent, or Firm* — Jeffrey S. Melcher; Melcher Patent Law PLLC

(57) ABSTRACT

A roadway access hole drill for cutting a square or rectangular access hole in a roadway having a first saw opposing a second saw and a third saw opposing a fourth saw. A method of cutting a microtrench in which the buried utility is exposed by opening a square or rectangular access hole in a roadway above the buried utility using the roadway access hole drill that is controlled by a computer system connected to an under-roadway detection unit that detects a buried utility and stops movement of the drill to avoid damaging the buried utility.

13 Claims, 13 Drawing Sheets

(56) References Cited

U.S. PATENT DOCUMENTS

| | | | |
|---|---|---|---|
| 7,451,757 B2* | 11/2008 | Ketterhagen | B28D 1/045 |
| | | | 299/39.3 |
| 7,914,618 B1 | 3/2011 | Krozel | |
| 9,127,418 B2* | 9/2015 | Bockes | E01C 23/096 |
| 9,203,226 B2 | 12/2015 | Miller | |
| 9,315,955 B2* | 4/2016 | Knapp | E01C 23/094 |
| 9,485,468 B2 | 11/2016 | Pino | |
| 9,873,992 B1* | 1/2018 | Knapp | E21B 7/027 |
| 10,311,102 B2 | 6/2019 | Pino | |
| 10,571,045 B2 | 2/2020 | Pino | |
| 10,571,047 B2 | 2/2020 | Pino | |
| 10,641,414 B2 | 5/2020 | Pino | |
| 10,648,139 B2* | 5/2020 | Knapp | E01C 7/147 |
| 10,781,942 B2 | 9/2020 | Pino | |
| 10,808,377 B1 | 10/2020 | Pino | |
| 10,808,379 B1 | 10/2020 | Pino | |
| 10,851,517 B2 | 12/2020 | Pino | |
| 10,876,654 B2 | 12/2020 | Pino | |
| 10,883,629 B2 | 1/2021 | Pino | |
| 11,028,556 B1 | 6/2021 | Pino | |
| 2004/0149174 A1 | 8/2004 | Farrington | |
| 2005/0036749 A1 | 2/2005 | Vogel | |
| 2005/0189127 A1 | 9/2005 | Martin | |
| 2011/0203565 A1* | 8/2011 | Hilsgen | E01C 23/0933 |
| | | | 125/12 |
| 2013/0011198 A1 | 1/2013 | Purcell | |
| 2013/0284070 A1 | 10/2013 | Dubey | |
| 2015/0125218 A1 | 5/2015 | Gustavsson | |
| 2016/0369610 A1 | 12/2016 | Wright | |
| 2016/0376767 A1 | 12/2016 | Miller | |
| 2018/0106015 A1 | 4/2018 | Pino | |
| 2018/0156357 A1 | 6/2018 | Pino | |
| 2018/0292027 A1 | 10/2018 | Pino | |
| 2019/0086002 A1 | 3/2019 | Pino | |
| 2019/0226603 A1 | 7/2019 | Pino | |

OTHER PUBLICATIONS

Corning Fiber Optic Extenders, https://www.corning.com/worldwide/en/products/communication-networks/products/fiber.html, Oct. 17, 2017 pp. 1-7.

SC Polymer, https://www.surecretedesign.com/product/liquid-concrete-polymer/, Oct. 17, 2017 p. 1.

SCAG Giant VAC, http://www.giant-vac.com/, Oct. 17, 2017pp. 1-2.

DR Power Vacuum, https://www.drpower.com/, Oct. 17, 2017pp. 1-2.

Billy Goat vaccum, www.billygoat.com, Oct. 17, 2017pp. 1-2.

Ditch Witch, www.ditchwitch.com, Oct. 17, 2017p. 1.

Trenchers, www.vermeer.com,Oct. 17, 2017 pp. 1-15.

Trenchers, www.samarais.com, Oct. 17, 2017pp. 1-2.

King, "Google Fiber finishes digging very shallow grave in Louisville, KY. #RIP," https://www.pocketables.com/2019/021 Joogle-fiber-finishes-digging-very-shallow-grave-in-louisville-ky-rip.html, published on Pocketable on Feb. 7, 2019, pp. 1-9.

Blum, "Microtrenching fail drives Google Fiber out of Louisville," https://www.tellusventure.com/blog/microtrenching- ail-drives-google-fiber-out--of-louisville/, published on Tellus Venture Associates, Feb. 8, 2019, pp. 1-3.

Otts, "Where is Google Fiber? Mostly in the Highlands, records show," hllps://www.wdrb.com/news/business/sunday- 3edition-where-is-google-fiber-moslly-in-the-highlands/article _569112e0-421 e-58ef-be24-c2e42e5e53d2.html, published in the Sunday Edition, WDRB, Sep. 14, 2018, pp. 1-10.

FASTRACT 400 material data sheet Aug. 23, 2018, pp. 1-4.

https://www.youtube.com/watch?v=0CGi92UK4Tw, Optic Fiber nastro in Torino, published Mar. 7, 2016, Garbin Group, pp. 1-3.

https://www.youtube.com/watch?v=klWluvLc5cl, The Ditch Witch MT12 MicroTrencher: Faster, Cleaner, Better, published Jun. 14, 2016, pp. 1-4.

https://www.youtube.com/watch?v=VWryq2nOA3U, Micro trenching | MTT-system, published Sep. 26, 2016, www.mttsystem.com, pp. 1-3.

https://www.youtube.com/watch?v=7xf2Ujax9hU, published Nov. 10, 2011, Micro-Trenching—alternative Möglichkeit zur Verlegung von Glasfaserkabeln, Schmidt@buglas.de, pp. 1-3.

https://www.youtube.com/watch?v=OlxA3gqNPKE, BVS-net, microtrenching, published Nov. 29, 2014, www. bvs-net.eu, pp. 1-3.

https://www.youtube.com/watch?v=929vJtv5Uxw, www, dellcron.com, published Feb. 10, 2018, pp. 1-3.

https://www.youtube.com/watch?v=8p4xHlwuMhl, Americicom, www.americomtech.com, Microtrenching, published Jun. 10, 2017, pp. 1-3.

https://www.youtube.com/watch?v=57NBkB1y8iM, published Jan. 14, 2014, KNET Mlcro Trenching Solution, pp. 1-4.

Geophysical Survey Systems, www.geophysical.com/products, pp. 1-23, 2020.

UtilityScan DF, quick start guide, MN72-489, pp. 1-68, pp. 2017-2018.

* cited by examiner

ROADWAY ACCESS HOLE CUTTER AND METHOD OF CUTTING A SQUARE OR RECTANGULAR ROADWAY ACCESS HOLE

FIELD OF THE INVENTION

The invention generally relates to a roadway access hole cutter that reduces the chance of rupturing a utility buried close to the roadway and a method of cutting a square or rectangular access hole in a roadway that avoids rupturing the buried utility.

BACKGROUND OF THE INVENTION

During installation of the optical fiber, a microtrench is cut in a roadway, the optical fiber and/or innerduct/microduct is laid in the microtrench and then a fill and sealant are applied over the optical fiber and/or innerduct/microduct to protect them from the environment. Methods of microtenching that can be utilized in the present invention include the methods described in my previous U.S. Pat. Nos. 10,641, 414; 10,571,047; 10,571,045; 10,781,942; 10,808,379; 10,808,377 and U.S. patent publication Nos. 20180292027; 20180156357, and 20180106015, the complete disclosures of which are incorporated in their entirety herein by reference.

Before cutting a microtrench in a roadway, the city must be notified. The city personnel will locate and mark buried utilities on the roadway. When a microtrench must cross a buried utility, the buried utility must first be exposed, which requires cutting an access hole through the roadway and then removing the dirt below the roadway through the roadway access hole. Currently, core saws, concrete saws, core drills and jack hammers are used to break through the roadway.

The city roadways are asphalt and/or concrete. Utilities, such as natural gas, water, telecommunications, and/or electric, are typically buried in the dirt or bedding below the roadway. Natural gas lines are usually required to have 12-36 inches of cover above them. For example, a 2 inch natural gas line would have to be buried 14 inches below the roadway in order to have 12 inches of cover (dirt or bedding) above the natural gas line.

However, often times codes are not followed by installers and natural gas lines can be installed just below the roadway. A jackhammer is usually used to form the access hole in the roadway. However, if the buried utility, such a natural gas line is not buried according to code and is just below the roadway, the jackhammer can cause the natural gas line to rupture causing a fire and serious injury or death. Furthermore, conventional core saws, concrete saws, and core drills can also damage the shallowly buried utility. There is a great need for a softer way of cutting an access hole that reduces the chances of rupturing a buried utility that is not to code, i.e. just below the roadway.

Even with marking of the buried utilities, crews are still damaging buried utilities at an alarming rate. There is a great need for an automated safety device to reduce damaging buried utilities.

SUMMARY OF THE INVENTION

An objective of the invention is to provide an improved roadway access hole drilling device and a safer method of microtrenching to avoid unintentionally cutting buried utilities.

The present invention utilizes a roadway access hole saw comprising a four saws and associated saw drives to rotate the saws, to provide a square or rectangular access hole in a roadway above the buried utility. The novel use of the roadway access hole saw provides a far faster and safer method to expose the buried utility, especially when the utility is not buried to code and is just below the roadway.

The objectives of the invention and other objectives can be obtained by a method of installing optical fiber, innerduct or microduct under a roadway comprising:
 drilling a square or rectangular access hole in a roadway above a buried utility using a roadway access four saw head comprising a first saw opposing a second saw and a third saw opposing a fourth saw;
 removing dirt below the roadway through the access hole to expose the buried utility;
 cutting a microtrench in the roadway using a microtrencher so that the microtrench crosses the buried utility and does not damage the buried utility;
 laying the optical fiber, innerduct or microduct in the microtrench; and
 filling the microtrench with a fill material to cover and protect the optical fiber, innerduct or microduct.

The objectives can also be obtained by a roadway access drill configured to reduce damage to a utility buried under a roadway comprising:
 a four saw head comprising a first saw opposing a second saw and a third saw opposing a fourth saw, wherein the four saw head is configured to cut a square or rectangular roadway access hole;
 at least one motor configured to drive the first, second, third and fourth saws; and a lifting device for lifting and lowering the roadway access drill.

DETAILED DESCRIPTION OF THE INVENTION

Figure 1A:
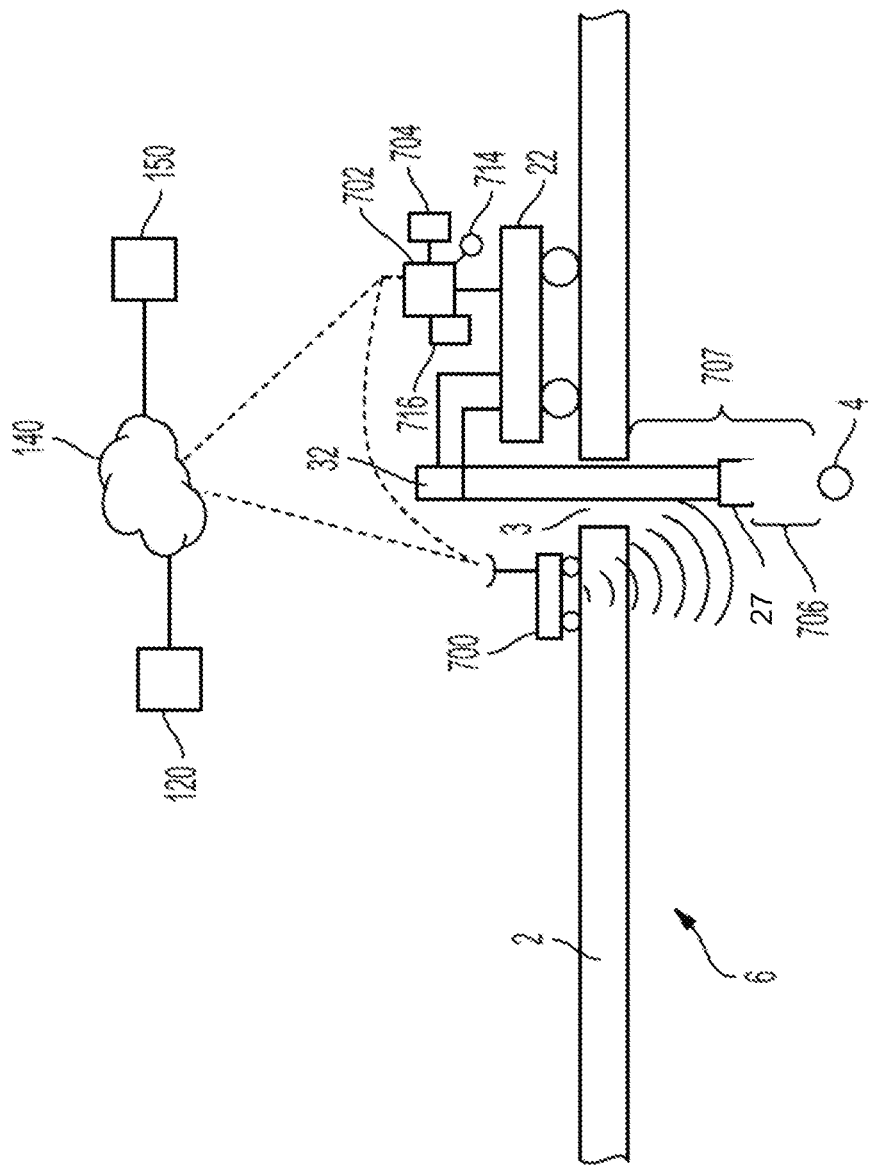
FIG. 1A illustrates a roadway access hole drill located over the roadway above a buried utility.

The invention will be explained by reference to the attached non-limiting Figs. In the description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention. However, it will be apparent to one skilled in the art that the present invention can be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention. All use of the word "example" are intended to describe non-limiting examples of the invention.

The operations described in the figures and herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

To facilitate an understanding of the principles and features of the various embodiments of the present invention, various illustrative embodiments are explained below. Although example embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways.

As used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

As illustrated, lines or arrows between elements can denote communications between the different elements. These communications can take any form known by those of skill in the art, including digital, telephonic, or paper. The communications can be through a WAN, LAN, analog phone line, etc. The information communicated can be in any format appropriate for the transmission medium.

"Data storage" can be non-transitory tangible memory, such as any one or a combination of a hard drive, random access memory, flash memory, read-only memory and a memory cache, among other possibilities. The data storage can include a database, implemented as relational database tables or structured XML documents or any other format. Such a database can be used to store the information gathered from transaction records and Thing Records. Non-volatile memory is preferred.

"Processor" can refer to a single data processor on a single computing device or a collection of data processors. The collection of data processors can reside on a single computing device or be spread across multiple computing devices. The processor can execute computer program code stored in the data storage or a memory. In one example, the processor can execute computer program code representative of functionalities of various components of the system.

While certain implementations of the disclosed technology have been described in connection with what is presently considered to be the most practical and various implementations, it is to be understood that the disclosed technology is not to be limited to the disclosed implementations, but, on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams do not have to be performed in the order presented or if at all, according to some implementations of the disclosed technology.

Computer program instructions can also be stored in a non-transient computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Figure 1B:
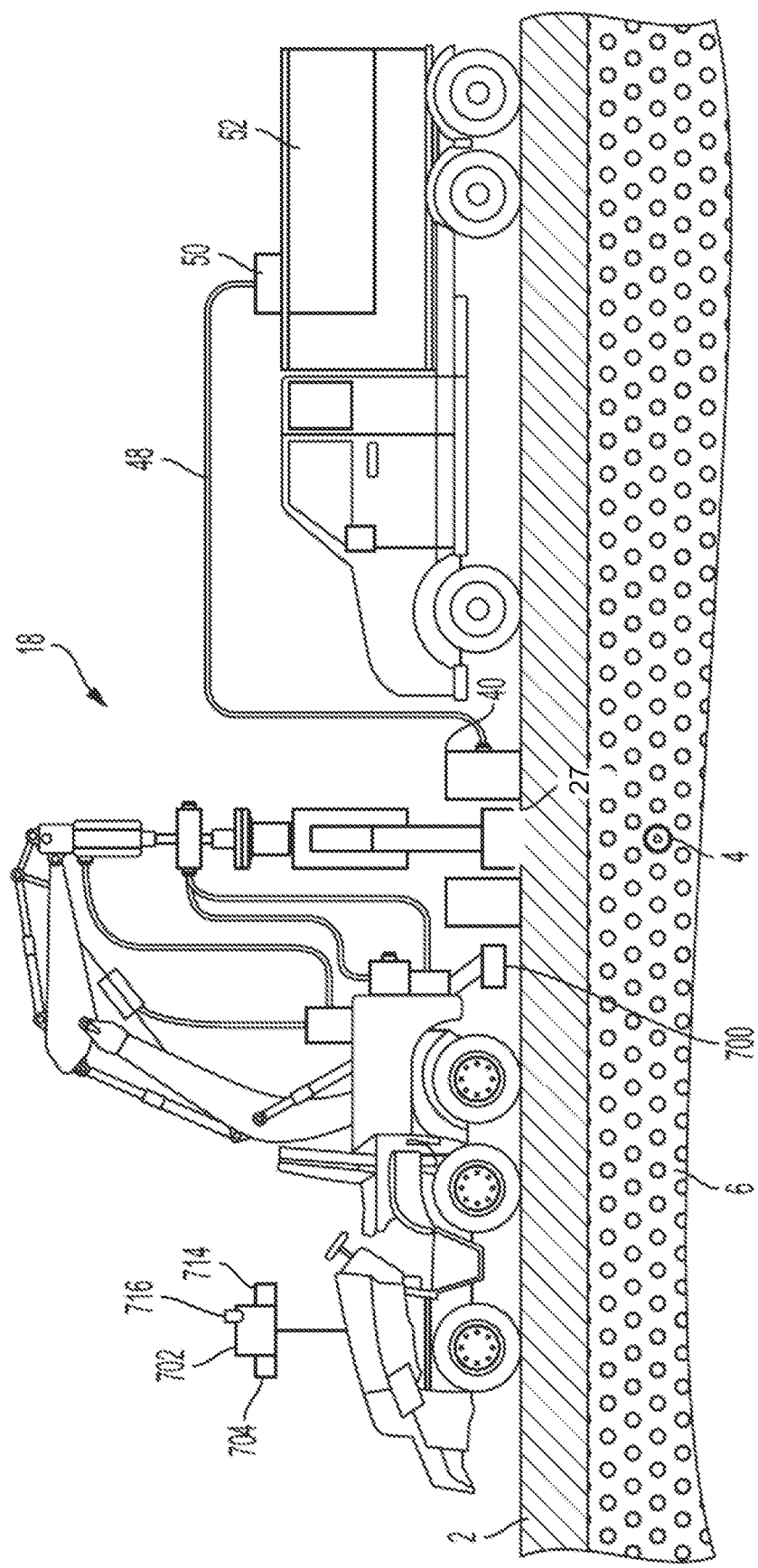
FIG. 1B illustrates a roadway access hole drill located over the roadway above a buried utility.
Figure 1C:
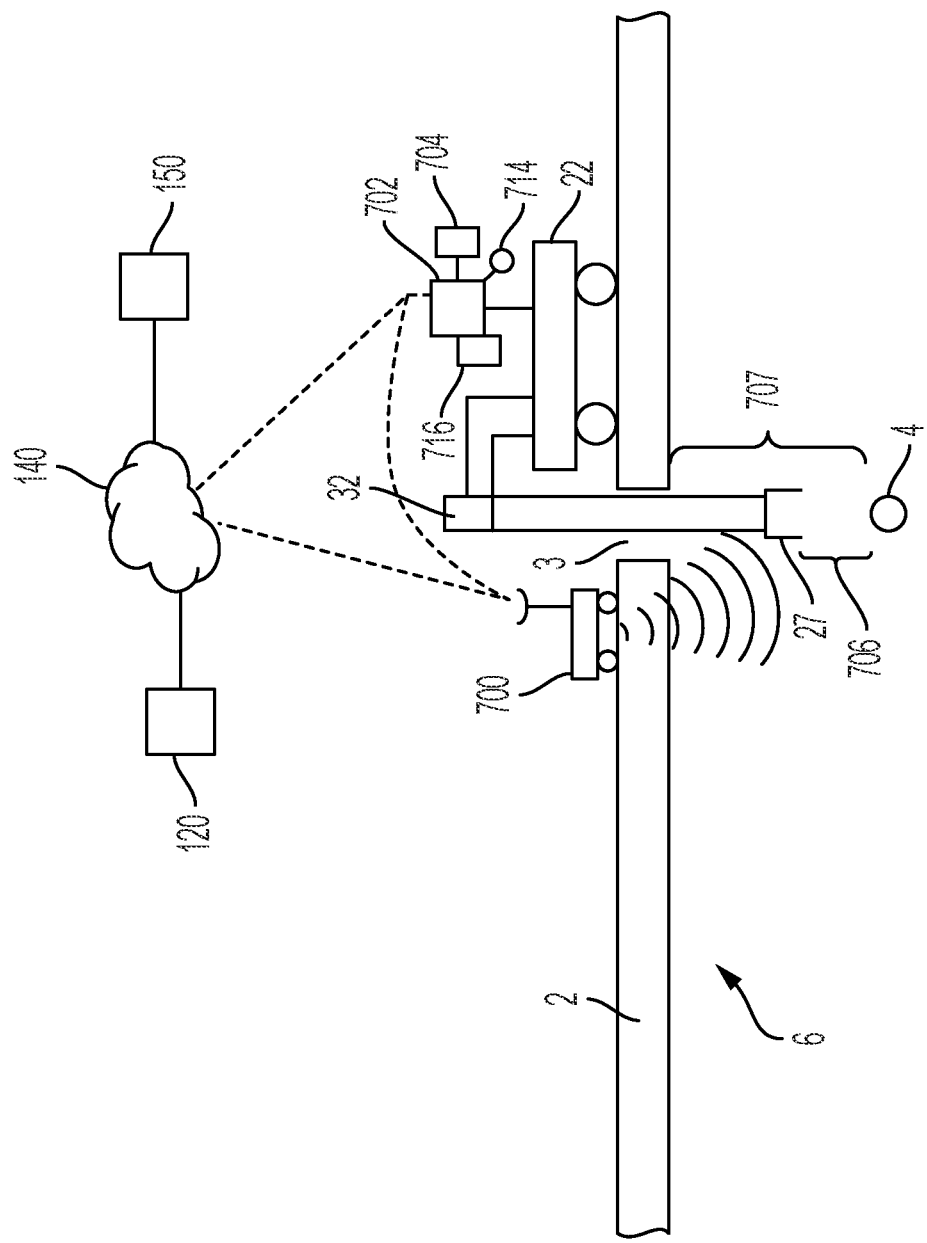
FIG. 1C illustrates a roadway access hole saw located over the roadway above a buried utility.

FIGS. 1A and 1B describe an example of a system for cutting a roadway access hole. The system comprises user interface devices 120, a server 150, and computer system 702, all interconnected via a communication network 140. All interconnections can be direct, indirect, wireless and/or wired as desired.

The network 140 can be any desired network including the internet or telephone network. Various networks 800 can be implemented in accordance with embodiments of the invention, including a wired or wireless local area network (LAN) and a wide area network (WAN), wireless personal area network (PAN) and other types of networks that comprise or are connected to the Internet. When used in a LAN networking environment, computers can be connected to the LAN through a network interface or adapter. When used in a WAN networking environment, computers typically include a modem, router, switch, or other communication mechanism. Modems can be internal or external, and can be connected to the system bus via the user-input interface, or other appropriate mechanism. Computers can be connected over the Internet, an Intranet, Extranet, Ethernet, or any other system that provides communications, such as by the network. Some suitable communications protocols can include TCP/IP, UDP, OSI, Ethernet, WAP, IEEE 802.11, Bluetooth, Zigbee, IrDa, WebRTC, or any other desired protocol. Furthermore, components of the system can communicate through a combination of wired or wireless paths, including the telephone networks.

The systems can be accessed via any user interface device 120 that is capable of connecting to the server 150 via the network 140. A plurality of user interface devices 120 can be connected to the server 150. An example user interface device 120 contains a web browser and display. This includes user interface devices 120 such as internet connected televisions and projectors, tablets, iPads, Mac OS computers, Windows computers, e-readers, and mobile user devices such as the smartphones, iPhone, Android, and Windows Phone, and other communication devices. The user interface device 120 preferably is a smartphone. The smartphone 120 can be in any form, such as a hand held device, wristband, or part of another device, such as vehicle.

The computer processing unit (CPU) of the user interface device 120 can be implemented as a conventional microprocessor, application specific integrated circuit (ASIC), digital signal processor (DSP), programmable gate array (PGA), or the like. The CPU executes the instructions that are stored in order to process data. The set of instructions can include various instructions that perform a particular task or tasks, such as those shown in the appended flowchart. Such a set of instructions for performing a particular task can be characterized as a program, software program, software, engine, module, component, mechanism, or tool. The non-transitory memory can include random access memory (RAM), ready-only memory (ROM), programmable memory, flash memory, and the like. The memory, include application programs, OS, application data etc.

The server 150 and/or computer system 702 described herein can include one or more computer systems directly connected to one another and/or connected over the network 140. Each computer system can include a processor, non-transitory memory, user input and user output mechanisms, a network interface, and executable program code (software) comprising computer executable instructions stored in non-transitory tangible memory that executes to control the operation of the server 150 and/or computer system 702. Similarly, the processors functional components formed of one or more modules of program code executing on one or more computers. Various commercially available computer systems and operating system software can be used to implement the hardware and software. The components of each server can be co-located or distributed. In addition, all or portions of the same software and/or hardware can be used to implement two or more of the functional servers (or processors) shown. The server 150 and/or computer system 702 can run any desired operating system, such as Windows, Mac OS X, Solaris or any other server based operating systems. Other embodiments can include different functional components. In addition, the present invention is not limited to a particular environment or server 150 and/or computer system 702 configuration. Preferably, the server 150 is a cloud based computer system. If desired for the particular application, the server 150 or portions of the server 150 can be incorporated within one or more of the other devices of the system, including but not limited to a user interface device 120.

The server 150 includes at least one web server and the query processing unit. The web server receives the user query and sends the user query to the query processing unit. The query processing unit processes the user query and responds back to the user interface device 150 and/or computer system 702 via the web server. The query processing unit fetches data from the database server if additional information is needed for processing the user query. The database is stored in a non-transitory tangible memory, and preferably a non-volatile memory. The term "database" includes a single database and a plurality of separate databases. The server 150 can comprise the non-volatile memory or the server 150 can be in communication with the non-volatile memory storing the database. The database can be stored at different locations.

Software program modules and data stored in the non-transitory memory the server 150 and/or non-volatile memory of the user interface device 150 and/or computer system 702 can be arranged in logical collections of related information on a plurality of computer systems having associated non-volatile memories. The software and data can be stored using any data structures known in the art including files, arrays, linked lists, relational database tables and the like. The server 150, computer system 702 and mobile user device 150 can be programmed to perform the processes described herein.

Saw head utility avoidance safety device.

Modern cities require an extensive range of utilities to function. The buried utilities include at least water, electricity, gas, telephone, and fiber optics. These utilities are typically provided through underground conduits. In theory, the location of the utilities is carefully recorded and held centrally by city authorities. In practice this does not universally occur and the location of many utilities can be unrecorded or recorded incorrectly. The determined location of the utility may be acquired by underground imaging, which is commonly accomplished by the use of ground penetrating radar (GPR). Typically, the location of buried utilities are separately determined by GPR and the location marked for later cutting or digging.

The present drill systems for installing optical fiber and/or innerduct microduct, or for installing a new utility, having a four saw head utility avoidance safety device greatly reduces the chances of damaging a buried utility caused by operator error, errors in four saw head location, errors in the buried utility location, and other errors. The utility avoidance safety device includes an under-roadway detection unit 700, which can be a GPR, connected to the computer system 702 that controls forward movement of the four saw head 27 during drilling. The computer system 702 can further comprise a drill control system 716.

A conventional GPR system comprises an electromagnetic detection unit, a computer system that receives detection data from the detection unit; a user interface device coupled to the computer system; and a display coupled to the computer system. The computer system interprets the detection data to provide a visual representation of the underground on the display. Computer systems are now well known and any suitable computer system comprising a processor in communication with non-volatile, non-transitory memory can be utilized.

U.S. patent publication No. 2003/0012411 (Sjostrom), discloses a system and method for displaying and collecting GPR data. U.S. Pat. No. 6,617,996 (Johansson), discloses a GPR system to provide an audible signal regarding size and how deep. My previous U.S. Pat. No. 10,571,047 discloses a GPR system for use in microtrenching. The complete disclosures of these patents and publications are incorporated herein by reference. Ditch Witch 2450R GPR is commercial example of a GPR machine that can detect at suitable speeds of 5.6 mph. Geophysical Survey Systems, Inc. also commercially sells suitable GPRs that can be utilized in the present invention.

In place of the usual GPR used to locate buried utilities, the invention can utilize other means of revealing buried utilizes or any tomography, including but not limited to, radio frequency identification, sound waves, electrons, hydraulic, vibration, magnetic, sonar, ultrasound, microwaves, xrays, gamma rays, neutrons, electrical resistivity tomography, Multi-channels Analysis of Surface Waves (MASW), and/or Frequency-domain Electra Magnetics (FDEM) induction. Any of these alternatives and later developed alternatives can be utilized. Thus, the under-roadway detection unit 700 can comprise GPR and/or any other alternative for detecting objects buried under the roadway. Preferably, the under-roadway detection unit 700 comprises a GPR.

As shown in FIGS. 1A-4A, the claimed invention utilizes an under-roadway detection unit 700 in a novel utility avoidance device for use on a roadway access hole drilling device 22 to create an access hole 3 in a city street (also referred to as a roadway 2) to install an optical fiber or innerduct/microduct 5 under the roadway 2. FIG. 4B shows a buried new utility 9 in place of the buried optical fiber or innerduct/microduct 5. Examples of the new utility 9 include electrical devices, including but not limited to coax cable, copper cable, low voltage cable and power cable.

As shown in FIG. 1A, the under-roadway detection unit 700 is configured to survey under the roadway 2 during drilling using the drilling device 22. Roadway access drilling devices 22 are now well known and any suitable access hole drilling device can be utilized in the present invention. However, the present invention utilizes a novel four saw head 27 in place of a normal drill head.

Figure 5A:
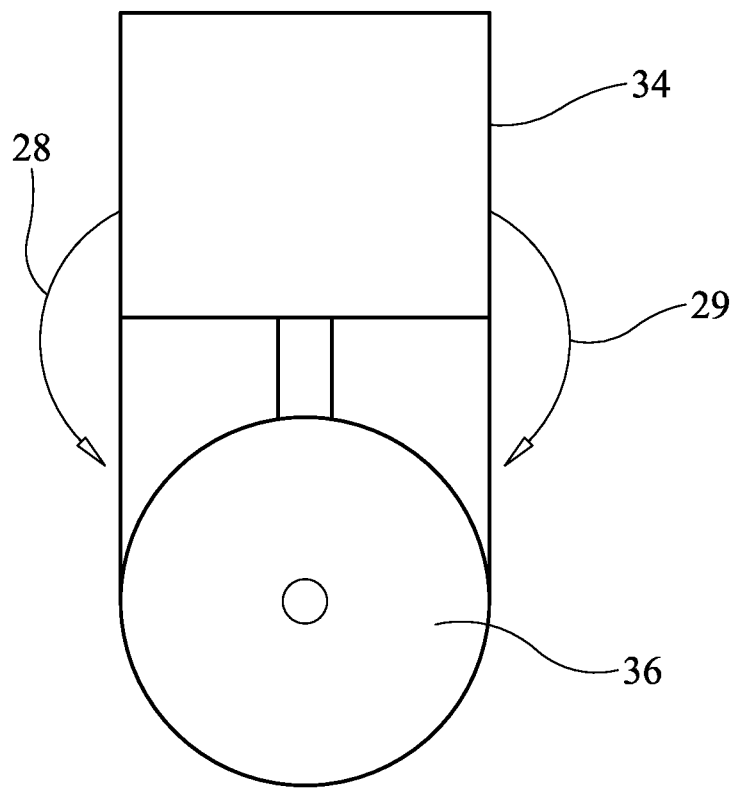
FIG. 5A illustrates a view of a saw.
Figure 5B:
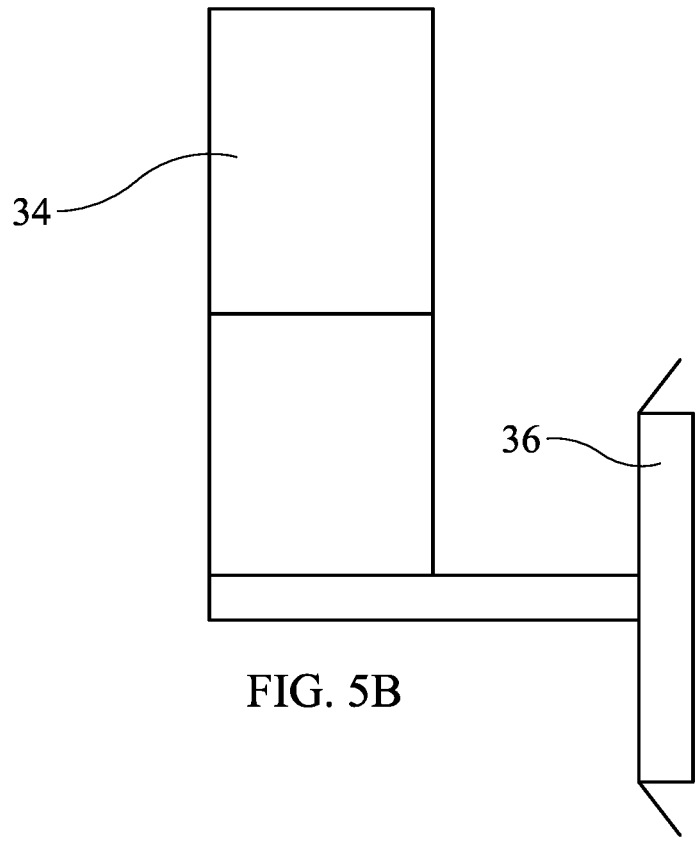
FIG. 5B illustrates a view of a saw.
Figure 5C:
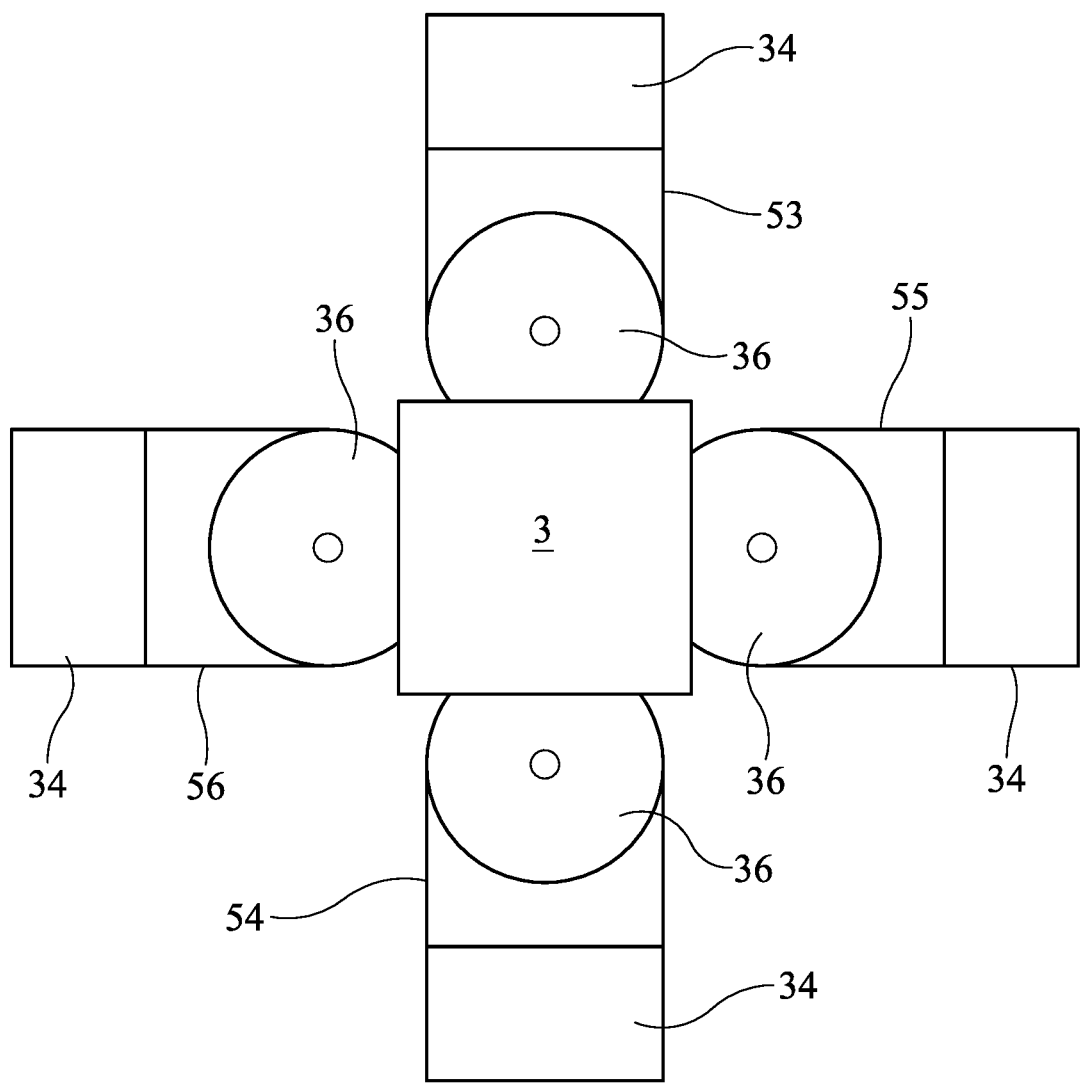
FIG. 5C illustrates a view of a saw head comprising four saws cutting a square or rectangular access hole in a roadway.

The four saw head 27 comprises a first saw 53 opposing a second saw 54 and a third saw 55 opposing a fourth saw 56. Preferably, each of the four saws 53, 54, 55, 56 can each have circular blade 36 driven by an individual motor 34 and a saw blade shroud 37 as shown in FIGS. 5A-5C. The saw blade shroud 37 protects an exposed surface of the blade 36. Each of the four saws 53, 54, 55, 56 cut an inside surface of the square or rectangular access hole 3.

The four saw head 27 can cut a square or rectangular access hole 3 in a roadway 2, such as asphalt or concrete. In a preferred embodiment, the first, second, third and fourth saws operate simultaneously to simultaneously cut the four sides of the square or rectangular access hole 3. Examples of suitable sizes for a square access hole 3 are each of the four sides being from 4 inches×4 inches to 16 inches×16 inches and depths ranging from 1 inch to 16 inches. Examples of suitable sizes for a rectangular access hole 3 are sides being from 4 to 16 inches and depths ranging from 1 inch to 16 inches.

Figure 5D:
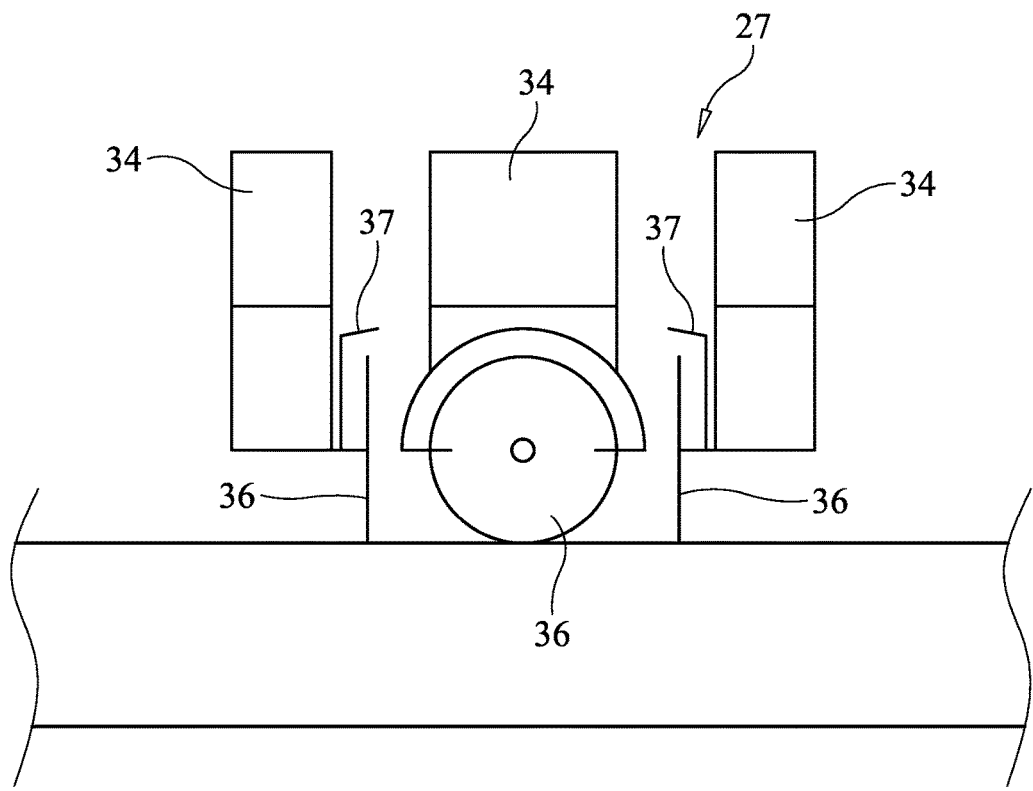
FIG. 5D illustrates a view of a saw head comprising four saws cutting a square or rectangular access hole in a roadway.
Figure 5E:
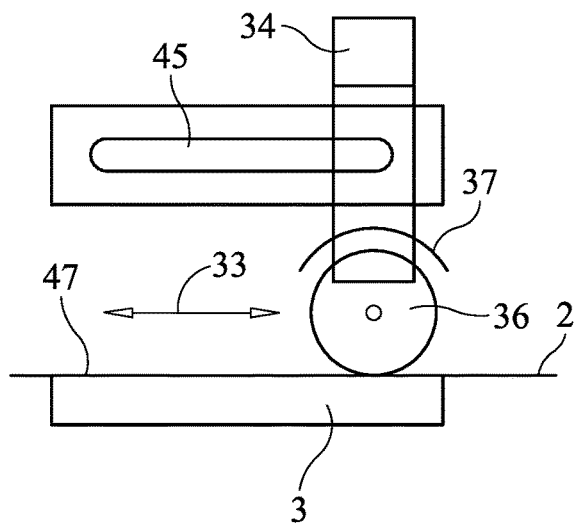
FIG. 5E illustrates a saw movably mounted to the four saw head.
Figure 5F:
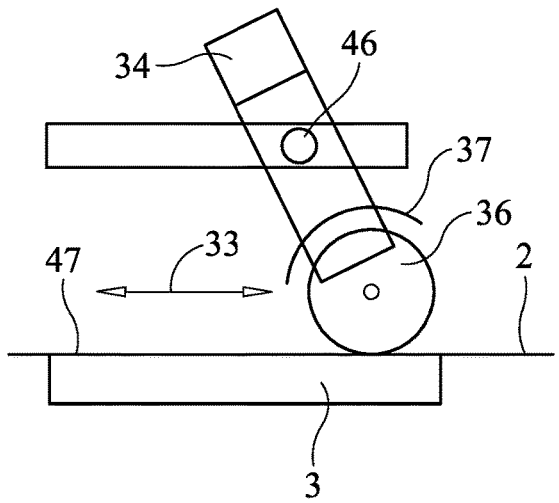
FIG. 5F illustrates a saw rotatably mounted to the four saw head.

As shown in FIGS. 5E, 5F, 5F each of the four saw blades 36 can move along the axis to cut the corners 35. If the saw blades 36 do not reach the corners 35, the corners 35 can be busted out after cutting the access hole 3.

Each of the four saws 53, 54, 55, 56 are preferably mounted in the four saw head 27 so that the positions of the saws 53, 54, 55, 56 does not change in relation to the four saw head 27. The inner walls of the square or rectangular access hole 3 are thus the same size as the diameter of the saw blades 36, as shown in FIGS. 5C and 5D. If a saw breaks, it is easily replaceable.

Figure 5G:
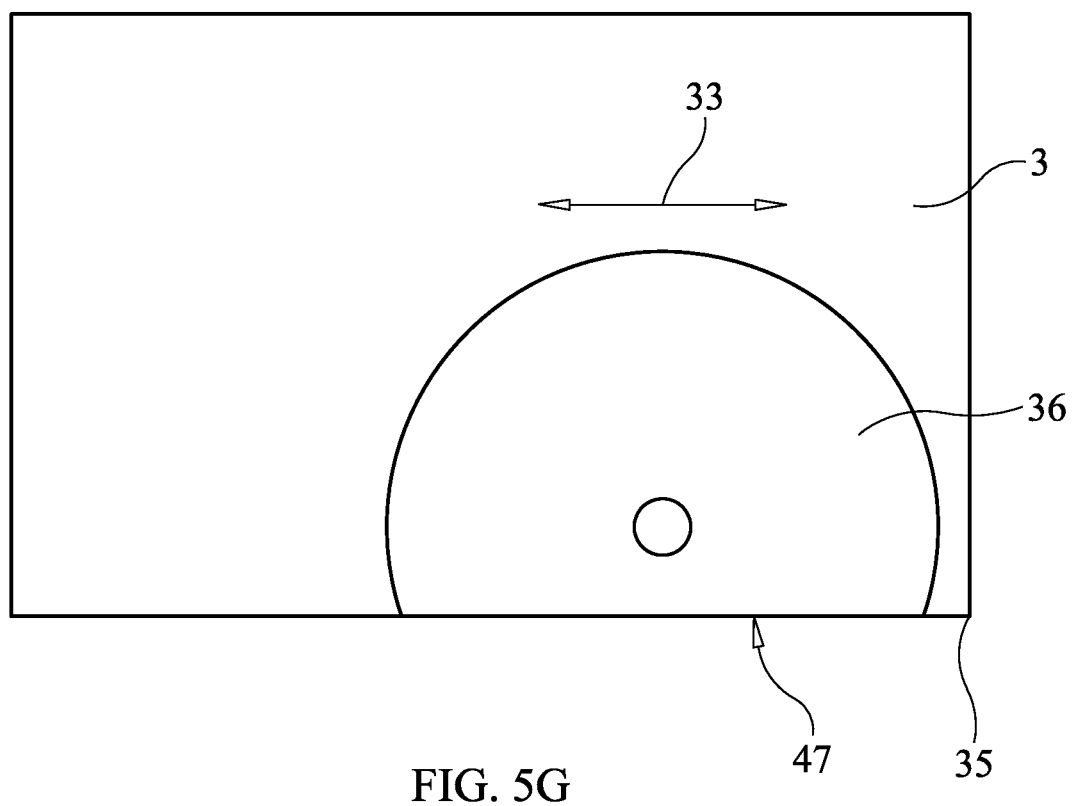
FIG. 5G illustrates a saw moving along a cutting plane in the square or rectangular access hole 3 being cut.

Alternatively, the four saws 53, 54, 55, 56 can be mounted on associated saw movable mounts 45 as shown in FIG. 5E that allow the saw blade 36 to move along a cutting plane 47, shown at 33, that creates an inner wall of the square or rectangular roadway access hole 3. FIG. 5G shows an example of how the saw 36 can move along a cutting plane 47, shown at 33, that creates an inner wall of the square or rectangular roadway access hole 3. Cutting two adjacent inner walls of the square or rectangular roadway access hole 3 forms the corner 35. In this manner, the inner walls of the square or rectangular access hole 3 can be made larger in size than the diameter of the saw blades 36.

In another alternative, the four saws 53, 54, 55, 56 can be mounted on associated saw rotatable mounts 46 as shown in FIG. 5E that allow the saw blade 36 to move along a cutting plane 47, shown at 33, that creates an inner wall of the square or rectangular roadway access hole 3. FIG. 5G shows an example of how the saw 36 can move along a cutting plane 47, shown at 33, that creates an inner wall of the square or rectangular roadway access hole 3. Cutting two adjacent inner walls of the square or rectangular roadway access hole 3 forms the corner 35. In this manner, the inner walls of the square or rectangular access hole 3 can be made larger in size than the diameter of the saw blades 36.

The device 18 is designed for making a neat clean cutout (roadway access hole 3) to help locate utilities or install a small utility handhole for various utility services such as telecommunications. The device 18 can be driven with four individual motors 34, each driving an associated saw blade 36, or one motor 32 powering all four saw blades 36. The four saw head 27 can have a water attachment 28 to keep the saw blades 36 cool while cutting or a pressurized air attachment 29 to provide air cooling to the saw blades 36. A saw blade shroud 37 can cover an exposed part of the saw blade 36 for safety as well as having a vacuum attachment for collecting all dust and debris.

Detection data from the under-roadway detection unit 700 can be sent to a computer system 702. The computer system 702 can send display information to the display 704 to display what is under the roadway 2 in the same manner as conventional GPR systems. The computer system 702 can also interpret the detection data in real time to identify objects under the roadway. For example, the computer system 702 can distinguish between utilities 4 under the roadway 2 and other objects under the roadway, such as reinforcing steel. The interpretation, i.e. a buried utility 4, can also be displayed on the display 704 for the drill operator, or on a user interface device 120. The computer system 702 determines the location of the identified utility 4, or object, to be avoided, such as depth and/or size in real time as the four saw head 27 is cutting through the roadway 2. The computer system 702 determines the distance between the four saw head 27 and the buried utility 4 in real time as the four saw head 27 is cutting through the roadway 2, which is shown at 706. A user interface device 120 can be coupled to the computer system 702 for the operator to control the under-roadway detection unit 700. The computer system 702 can also determine the distance between the roadway 2 and the buried utility 4, shown at 709.

When the computer system 702 identifies a buried utility 4 in the path of the four saw head 27, the computer system 702 can send an alert 714 to the drill and/or stop forward movement of the four saw head 27. In this manner, there is added protection against undesirable cutting of buried utilities 4 by the four saw head 27.

Drill control systems 716 for controlling forward movement and/or directional control of the four saw head 27 are now well known. The computer system 702 is connected to the drill control system 716 to override control of the four saw head 27 when necessary to avoid damaging a buried utility 4. For example, forward movement of the four saw head 27 can be automatically stopped by the computer system 702 and/or drill control system 716 at a set distance 706, such as from 2-24 inches, preferably 4-12 inches.

The under-roadway detection unit 700 can be connected to the computer system 702 by wireless and/or wired connection, and/or indirectly by a network 140. Additional attachments can be connected to the computer system 702 as desired. Examples of additional attachments are shown in FIG. 1A. The connections between the additional attachments can be wired and/or wireless directly and/or indirectly by the network 140. Examples of additional attachments include user interface devices 120 and/or a server 150.

The computer system 702 can comprise a global positioning device or other positioning device to map the location of the microtrench 12, buried utilities 4 detected by the under-roadway detection unit 700, and the buried optical fiber and/or innerduct/microduct 5, or buried new utility 9.

The computer system 702 can be connected to a network 140 for transmitting drilling data to the server 150 connected to the network 140 and/or user interface devices 120 connected to the network 140. The drilling data can include, for example, the measurements of the access hole 3, video of the hole 3, location of the hole 3, location of the buried utilities 4 detected by the under-roadway detection unit 700, location of the buried optical fiber and/or innerduct/microduct, speed of microtrenching, and any other information as desired, in real time. The drilling data can also be stored on the computer system 702, or by any other means, such as USB, flash drives, etc., for later uploading or accessing.

Figure 6A:
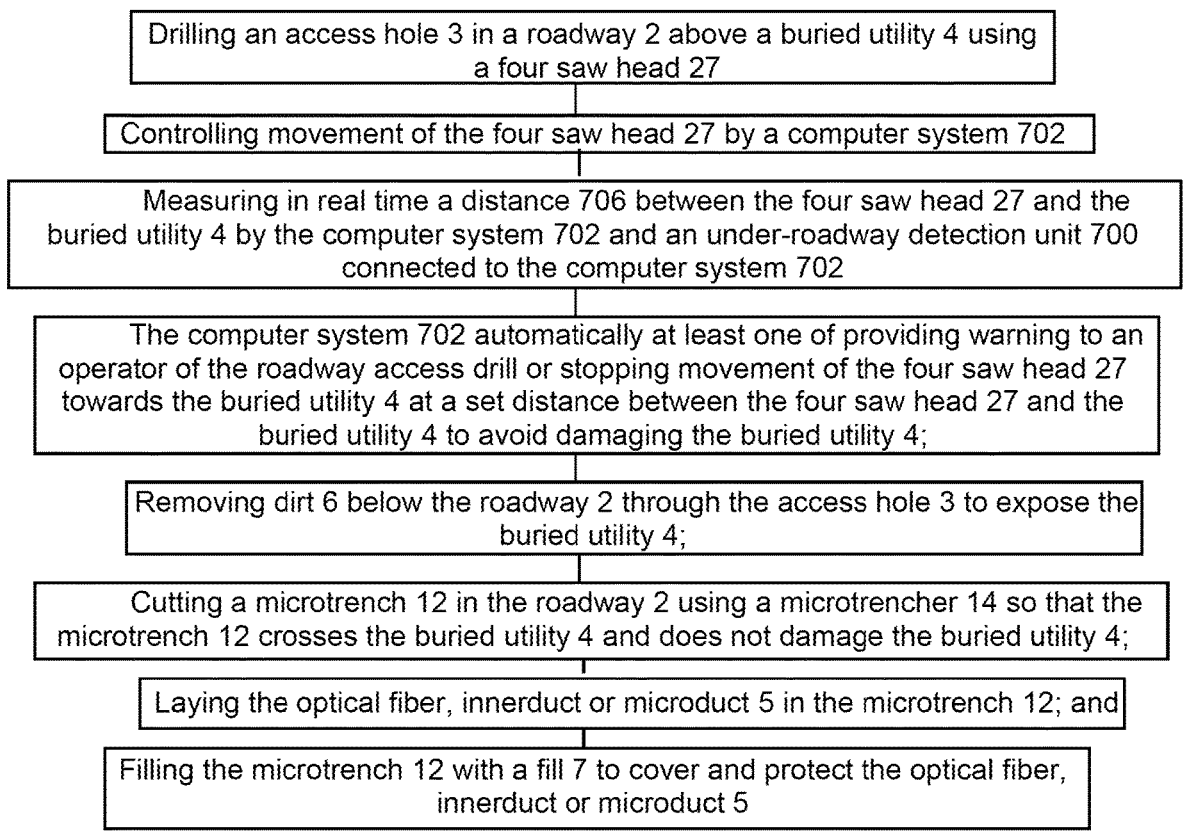
FIG. 6A illustrates a flow chart of a method of cutting a square or rectangular roadway access hole.
Figure 6B:
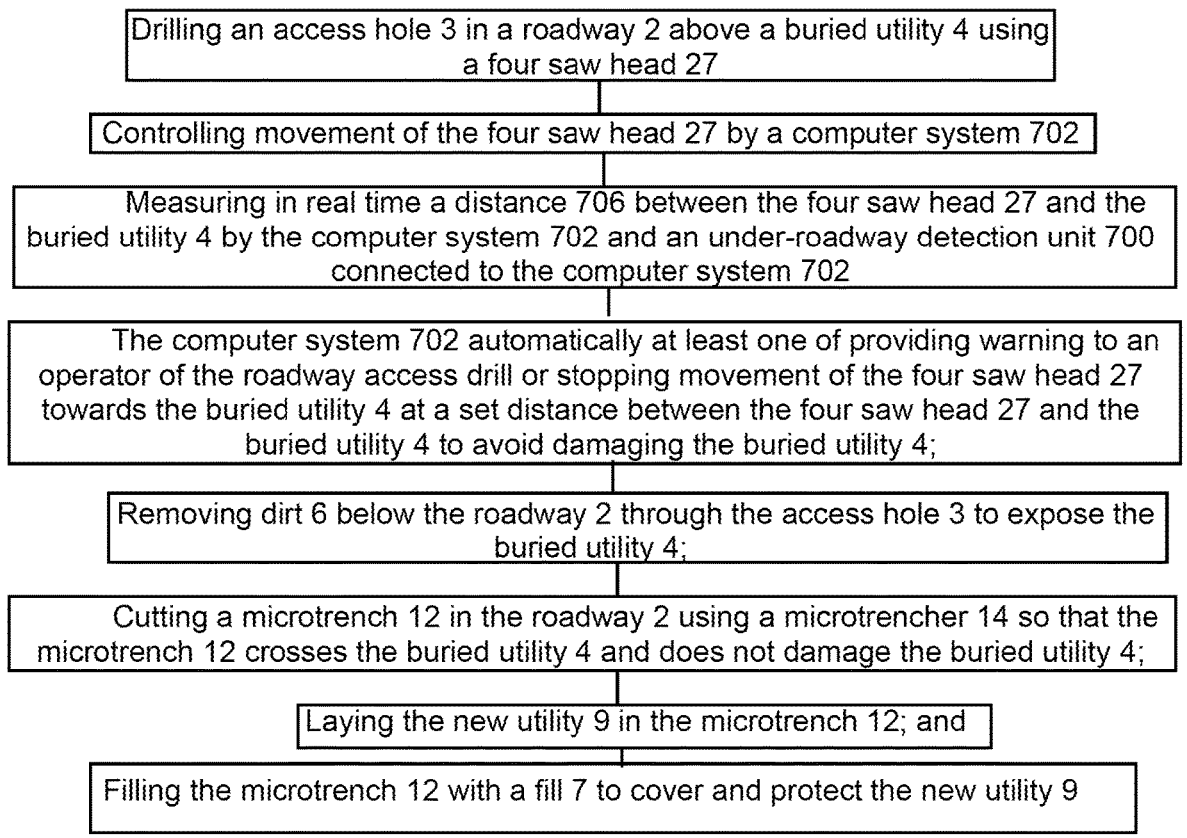
FIG. 6B illustrates a flow chart of a method of cutting a square or rectangular roadway access hole.

With the present method and system, as described in the flow diagrams of FIGS. 6A and 6B, the location of buried utilities 4 can be accurately determined in real time, the access hole 3 drilled in a manner that avoids the four saw head 27 damaging the buried utilities 4, a microtrench 12 cut, spoil vacuumed out of the microtrench 12, the measurements of the microtrench 12 measured 720, 722, the optical fiber and/or innerduct/microduct 5 or buried new utility 9 can be installed in the microtrench 12, and the microtrench 12 filled with fill 7, all conducted simultaneously and continuously at the rates disclosed herein above, which are far faster rates than previously. The drilling information can be uploaded in real time to a central database for use by the city, managers, traffic controllers, supervisors, and any others as desired. In this manner, the actual location of buried utilities can be more precisely mapped and stored in city records.

Any suitable microtrencher 14 can be utilized in the present invention. Non-limiting examples of suitable micro trenchers include those made and sold by Ditch Witch, Vermeer, and Marais. A Vermeer RTX 1250 tractor can be used as the motorized vehicle for the microtrencher 14. A microtrencher 14 has is a "small rock wheel" specially designed for work in rural or urban areas. The microtrencher 14 is fitted with a microtrencher blade 15 that cuts a microtrench 12 with smaller dimensions than can be achieved with conventional trench digging equipment. Microtrench 12 widths usually range from about 6 mm to 130 mm (¼ to 5 inches) with a depth of 750 mm (about 30 inches) or less. Other widths and depths can be used as desired.

With a microtrencher 14, the structure of the road, sidewalk, driveway, or path is maintained and there is no associated damage to the road. Owing to the reduced microtrench 12 size, the volume of waste material (spoil) excavated is also reduced. Microtrenchers 14 are used to minimize traffic or pedestrian disturbance during cable laying. The microtrencher 14 can work on sidewalks or in narrow streets of cities, and can cut harder ground than a chain trencher, including cutting through for example but not limited to solid stone, concrete, and asphalt.

A debris containment shroud 40 can be placed on the roadway 2 over the buried utility 4 to be exposed. The debris containment shroud 40 can be attached to a vacuum hose 48 attached to a source of vacuum 50. The debris containment shroud 40 is configured to provide a vacuum to a hollow chamber 44 during use. During use, the debris containment shroud 40 rests on the roadway 2 surface and the debris, such as dust, chips, particles, etc., and water if present are vacuumed away through the vacuum hose 48 and into a vacuum storage container 52. The vacuum hose 48 can be any size as desired, such as from 4 to 12 inches in diameter. Sources of vacuum 50 are now well known and any suitable vacuum source can be utilized, such as those made by SCAG Giant Vac., DR Power, Vermeer, and Billy Goat.

Figure 2:
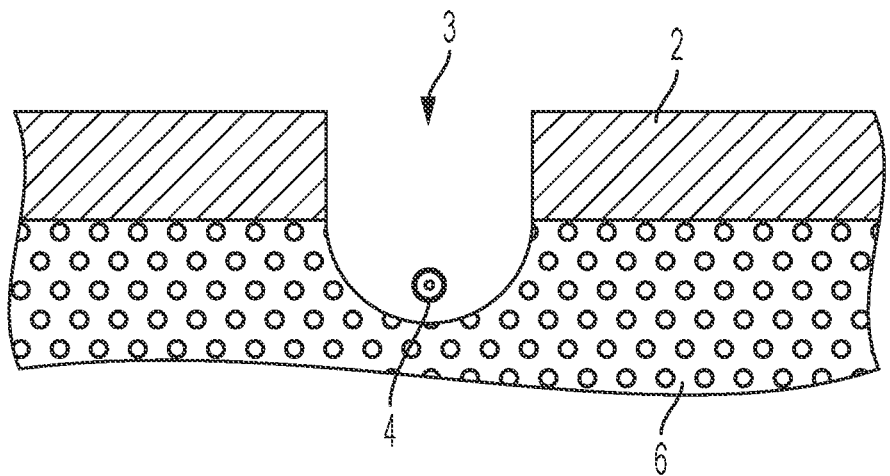
FIG. 2 illustrates hole in the roadway cut by the roadway access hole drill to expose the buried utility.
Figure 3:
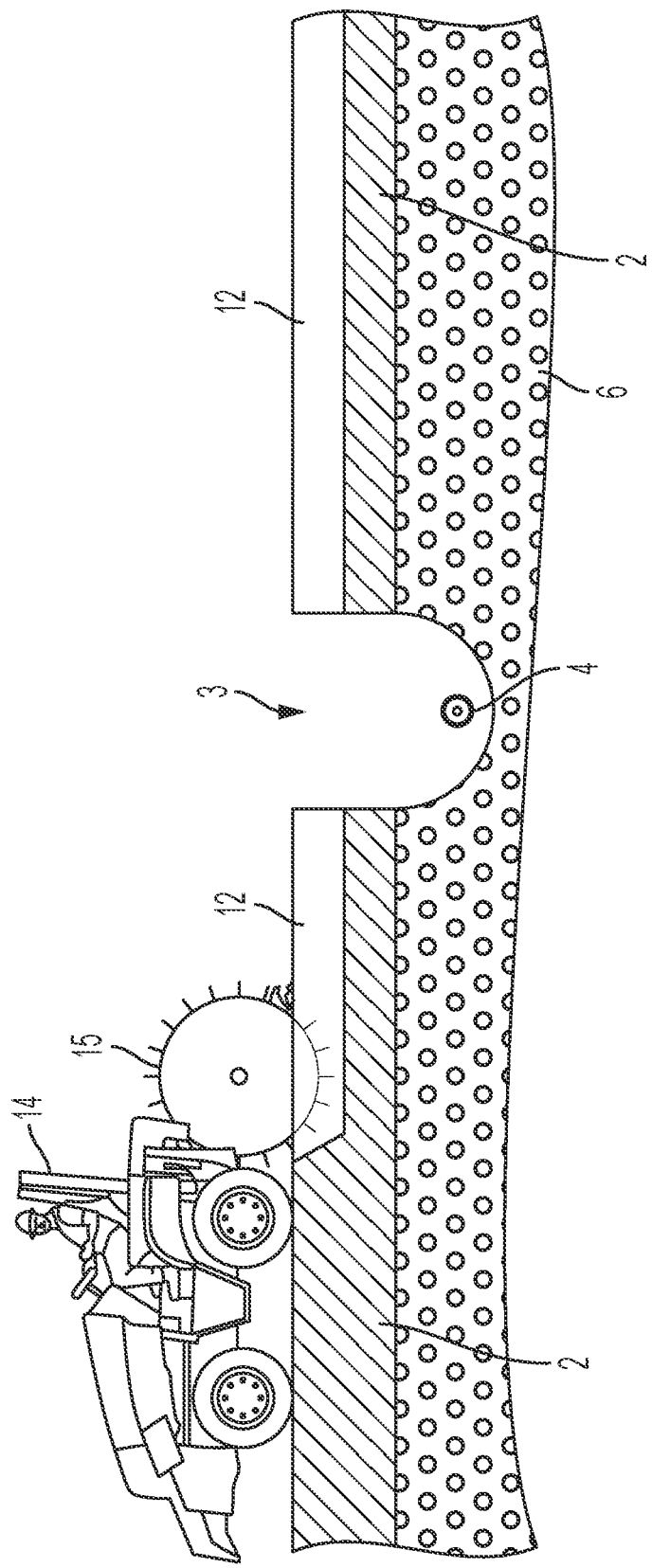
FIG. 3 illustrates a microtrencher cutting a microtrench in the roadway that crosses the exposed previously buried utility.
Figure 4A:
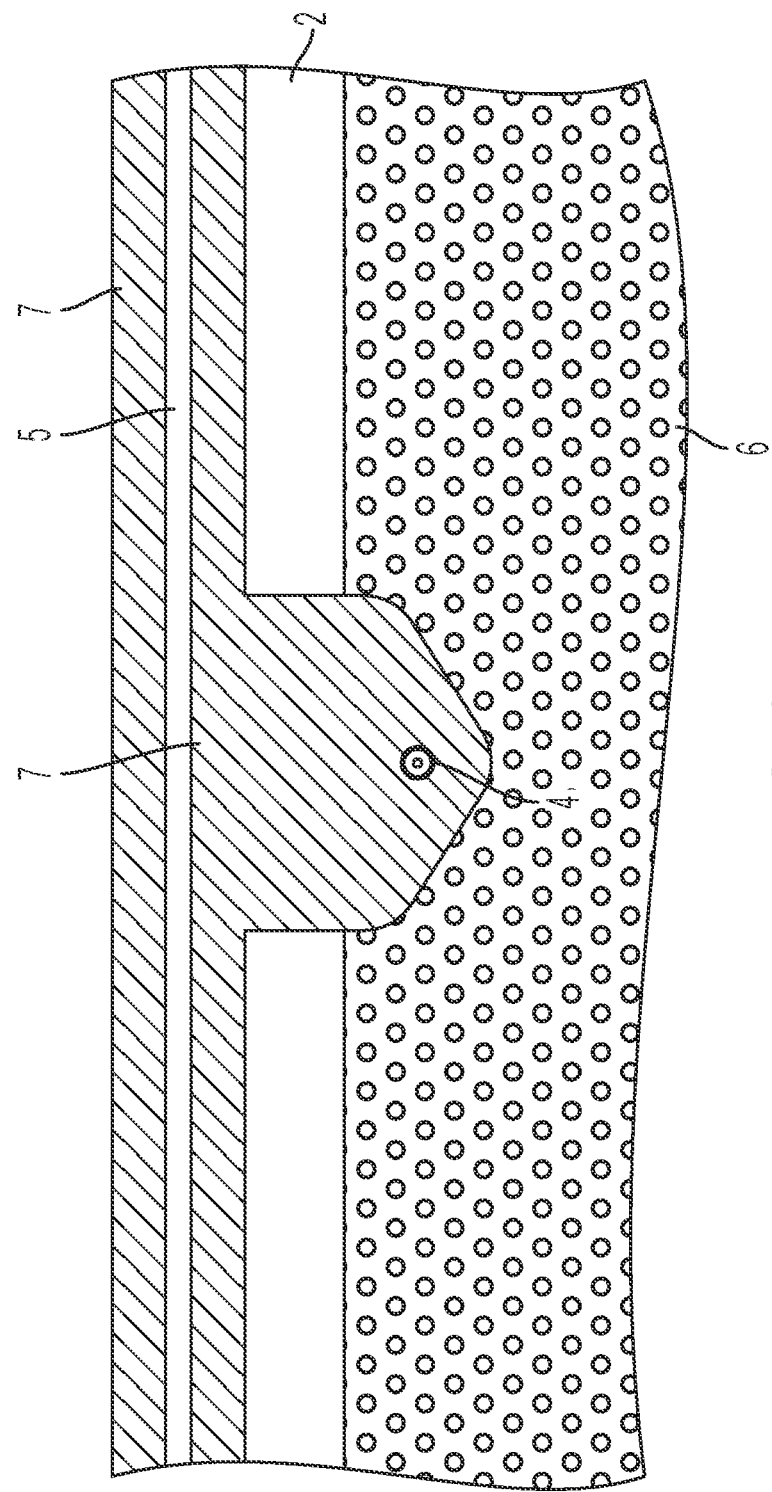
FIG. 4A illustrates an optical fiber sealed in the microtrench by a fill.
Figure 4B:
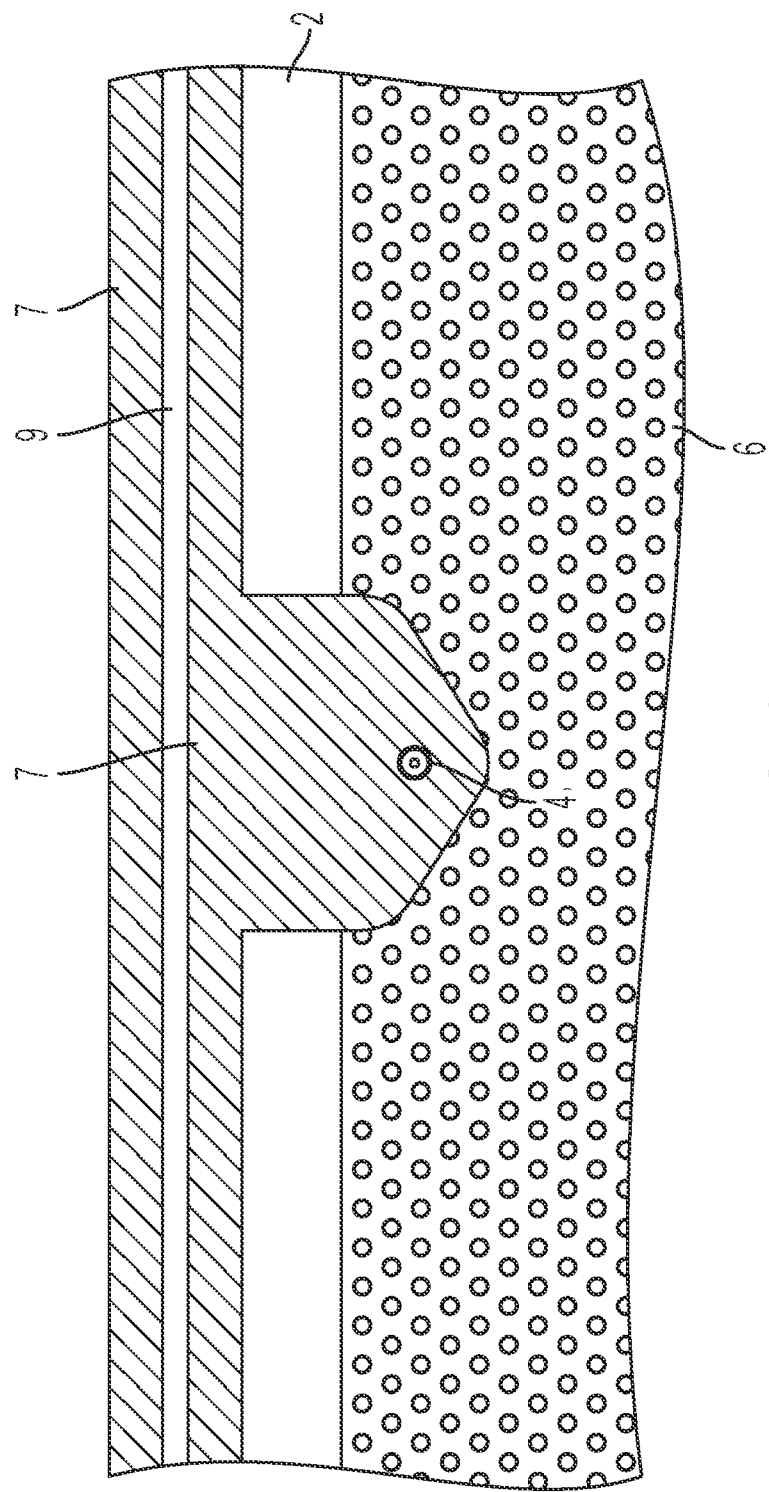
FIG. 4B illustrates a buried utility sealed in the microtrench by a fill.

As shown in FIGS. 2 and 3, once the buried utility 4 is exposed, a microtrencher 14 is used to cut a microtrench 12 in the roadway so that the microtrench 12 crosses the buried utility 4 without damaging the buried utility 4. As shown in FIG. 4A, the optical fiber, innerduct, or microduct 5 can be laid in the microtrench 12, and the a fill 7 can be applied to cover the hole 3 and fill the microtrench 12 to cover and protect the optical fiber, innerduct, or microduct 5. As shown in FIG. 4B, the new utility 9 can be laid in the microtrench 12, and the fill 7 can be applied to cover the hole 3 and fill the microtrench 12 to cover and protect the new utility 9.

Example

On 19 Nov. 2020, one of my crews struck a buried gas line while installing optical fiber. The gas line The Gas line was mismarked by approximately twenty-one (21) inches and buried approximately six (6) inches deep. 911 and 811 were contacted. This type of accident happens far too often and the chances of this type of accident happening can be greatly reduced using the present invention. The following information is the ticket:

811 Ticket #2082405236 (Nov. 19, 2020)
Dig Up Tkt #2082843411
When did it happen: 3:00 PM
Impact to residents: 2
Evacuation?: No
Main line: No
Service line: Yes
Scope of work: Microtrenching—2213 Rountree Dr.
Positive Locate: Mismarked
Reason for strike: Mismarked by 21"
Repair status: Gas has been contained; TGS On Site
ConEx Ticket Number: 174074741

REFERENCE NUMBERS

2 Roadway
3 Square or rectangular access hole

4 Buried utility
5 Optical fiber, innerduct, microduct
6 Dirt
7 Fill
9 New utility
12 Microtrench
14 Microtrencher
15 Microtrencher blade
18 Drilling Device
22 Roadway access drilling device
27 Four saw head
28 Water attachment
29 Pressurized air attachment
30 Saw blade shroud
32 Motor
33 Movement of blade 36 along cutting plane 47
34 Individual motor
35 Corner of square or rectangular access hole
36 Saw blade
37 Saw blade shroud
40 Debris containment shroud
44 Hollow chamber
45 Saw movable mount
46 Saw rotatable mount
47 Cutting plane
48 Vacuum hose
50 Source of vacuum
52 Vacuum storage container
53 First saw
54 Second saw
55 Third saw
56 Fourth saw
120 User interface device
140 Network
150 Server
700 Under-Roadway Detection Unit
702 Computer System
704 Display
706 Distance between buried utility 4 and four saw head 27 during cutting
707 Distance between buried utility 4 and roadway 2
714 Alert to Drill Operator
716 Drill control system It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention. While the invention has been described to provide an access hole over a buried utility, the invention can be utilized wherever an access hole in the roadway is required.

The invention claimed is:

1. A method of installing optical fiber, innerduct or microduct under a roadway comprising:
   drilling a square or rectangular access hole in a roadway above a buried utility using a roadway access four saw head comprising a first saw opposing a second saw and a third saw opposing a fourth saw;
   removing dirt below the roadway through the access hole to expose the buried utility;
   cutting a microtrench in the roadway using a microtrencher so that the microtrench crosses the buried utility and does not damage the buried utility;
   laying the optical fiber, innerduct or microduct in the microtrench; and
   filling the microtrench with a fill material to cover and protect the optical fiber, innerduct or microduct.

2. The method according to claim 1, wherein at least one of the first, second, third and forth saws comprises a circular saw blade driven by an associated motor.

3. The method according to claim 1, further comprising controlling the movement of the four saw head by a computer system; measuring in real time a distance between the four saw head and the buried utility by the computer system and an under-roadway detection unit connected to the computer system; and the computer system automatically at least one of providing warning to an operator of the roadway access drill or stopping movement of the four saw head towards the buried utility at a set distance between the four saw head and the buried utility to avoid damaging the buried utility.

4. The method according to claim 1, further comprising placing a debris containment collar on a roadway surface over a buried utility, the debris containment collar having a debris containment collar body defining a hollow chamber sized to accept the four saw head; and
   inserting the four saw head into the hollow chamber of the debris containment collar so that the debris containment collar body surrounds the four saw head.

5. The method according to claim 4, further comprising providing a source vacuum to the hollow chamber of the debris containment collar and vacuuming debris from the access hole during drilling.

6. The method according to claim 1, wherein the set distance comprises 2-24 inches.

7. The method according to claim 1, wherein the set distance comprises 4-12 inches.

8. The method according to claim 1, wherein the computer system automatically stopping movement of the four saw head towards the buried utility at a set distance between the four saw head and the buried utility to avoid damaging the buried utility.

9. The method according to claim 1, further comprising uploading buried utility information from the computer system to a server using a network, wherein the buried utility information comprising a location of the buried utility.

10. The method according to claim 1, further comprising making a video of the drilling of the access hole and cutting of the microtrench.

11. The method according to claim 1, further comprising uploading buried utility information from the computer system to a server using a network, wherein the buried utility information comprising a location of the buried utility.

12. The method according to claim 1, further comprising making a video of the drilling of the access hole and cutting of the microtrench.

13. The method according to claim 1, further comprising moving at least one of the first, second, third or fourth saws along a cutting axis to cut an inside corner of the roadway.

* * * * *